Oct. 31, 1961 L. R. FITCH ET AL 3,006,227
WRENCH FOR HYDRANT OUTLETS
Filed Dec. 12, 1960 2 Sheets-Sheet 1

INVENTORS
LYLE R. FITCH
LESLIE L. FITCH
RENE RODIGOU
BY

Oct. 31, 1961   L. R. FITCH ET AL   3,006,227
WRENCH FOR HYDRANT OUTLETS
Filed Dec. 12, 1960   2 Sheets-Sheet 2

INVENTORS
LYLE R. FITCH
LESLIE L. FITCH
RENE RODIGOU

United States Patent Office 3,006,227
Patented Oct. 31, 1961

3,006,227
WRENCH FOR HYDRANT OUTLETS
Lyle Robert Fitch, Leslie L. Fitch, and Rene Rodigou, San Francisco, Calif.
Filed Dec. 12, 1960, Ser. No. 75,224
7 Claims. (Cl. 81—125)

This invention relates to an improved wrench for installing and removing irregular shaped conduit outlet fixtures or fittings such as hydrant fittings having an angular bend or snout like shape.

In the erection of conduit systems there has long been a problem of handling irregular-shaped conduit fittings, particularly where, in installing and removing such fittings, space is limited and where a large torque must be applied without causing damage to the fittings or to surrounding structure. Such a problem arose in connection with the installation and removal of hydrant outlets of the type universally installed in buildings for fire fighting purposes.

Hydrant outlets are usually installed in a manifold arrangement in groups of three or four, either in a vertical or horizontal row. Such outlet fittings are normally connected to a central water main within the building wall by means of a threaded end section having an integrally attached hex nut between the threaded portion and an exterior outlet "snout." Generally, in order to be as attractive as possible, the exposed outlet portion of such fittings are made of brass or bronze and mounted on a polished mounting plate of similar material. Although on some fittings, the outlet portion extends straight out from the mounting plate, the standard type outlets are drooped or bent downward at an angle from the mounting plate in order to facilitate the attachment of hoses and to allow for the fitting to drain when not in use.

All of these factors, the size of the fittings, their conspicuous location which requires a polished metal exterior, their general irregular shape and the surrounding mounting structure required in a typical installation, combine to create a serious problem of providing a means of holding the fitting so that it can be installed or removed from a conduit without damaging the fitting or its polished mounting plate.

It is, therefore, an important object of the present invention to provide a means for obtaining and holding an adequate grip on a snout-type hydrant fitting so that adequate torque can be applied thereto to properly tighten the fitting or loosen it during its removal.

Another object of the invention is to provide a wrench for "snout-type" fittings that can be used to install or remove such fittings without scratching, scarfing, or otherwise damaging the fitting itself or its mounting plate during the installation thereof.

More specifically, an object of the invention is to provide a wrench for outlet fittings on conduits which will fully support a fitting by engaging it at two points to thus eliminate any distortion of the fitting when torque is applied during its installation or removal from the conduit.

Another object is to provide a wrench for an outlet fitting which can be maintained in a fixed predetermined position relative to the fitting and adjusted thereon to provide clearance with structure adjacent to the fitting.

Another object is to provide a wrench which is easily attached to the fitting during use and which will not wobble or slip off of the fitting when torque is applied.

Another object is to provide a wrench which is inexpensive and easy to construct.

The aforesaid objects of the invention are accomplished by a novel wrench structure which has a frame member at one end to engage the flat-sided nut on the fitting and an adjustable means supported within the wrench frame to positively engage the outlet end of the curved-snout. The fitting is thus supported at two points, i.e. at the centrally located driving nut and at the open end of the snout. Also, in accordance with the principles of the invention, the novel adjustable support means constantly maintains a clearance between the face of the socket plate which fits around the driving nut and the adjacent mounting plate during the installation or removal of the fitting no matter how much torque is required to rotate it, so that no damage can occur to the polished surfaces.

Other objects and advantages of the invention will be evident from a review of the following specifications and drawings herein.

Figure 1:
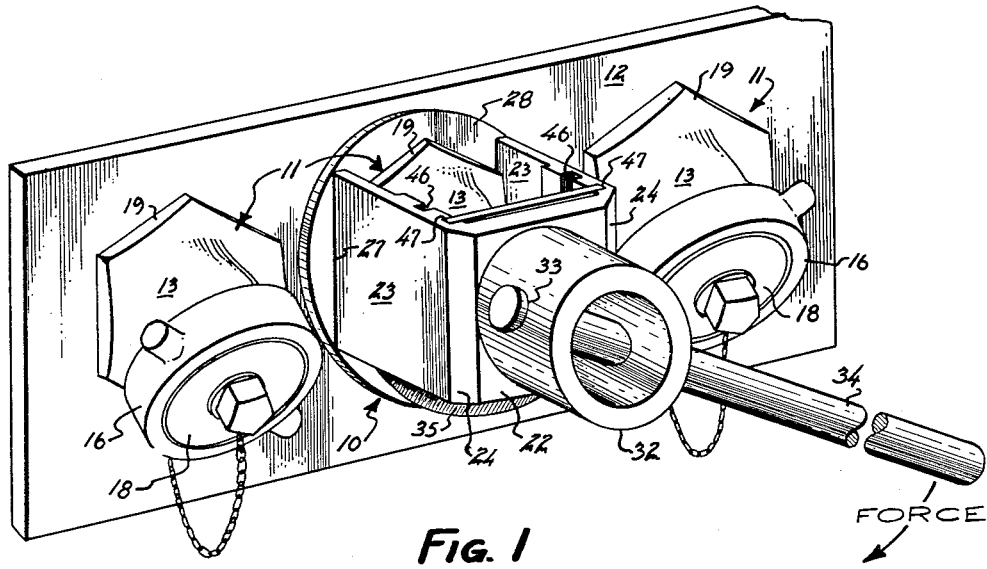
FIG. 1 is a view in perspective showing a manifold of hydrant outlet fittings with a wrench embodying the principle of the present invention attached to the center "snout-type" fitting.

In FIG. 1 a wrench 10 embodying the principles of the present invention is shown connected to one of the typical "snout-type" outlet fittings 11 arranged on a mounting plate 12 to form a standard type of hydrant manifold used for fire protection purposes.

The fitting 11 has the same or equivalent design features found on most of such "snout-type" fittings and comprises a body section 13 which curves downward from the mounting plate 12 so that the center of its outlet end 14 is on a line which extends from the horizontal at some predetermined angle, usually approximately 30°. Though the snout-type fittings are by far the most prevalent, some hydrant fittings have a substantially cylindrical body section and extend straight out from the mounting plate. The present invention also includes means to accommodate these fittings. Near the end 14 of the body section 13 is an annular recess 15 (FIG. 3) which serves to retain a rotatable internally threaded collar member 16 thereon. The collar member 16 may have a flat-sided exterior such as in the shape of a hex nut or it may be smooth with protruding knobs 17, as shown in the drawings, to provide a means to rotate the collar 16. When the outlet 11 is not being used, a threaded plug member 18 (FIG. 1) is retained within the collar 16 to prevent leakage from the outlet end 14.

Figure 3:
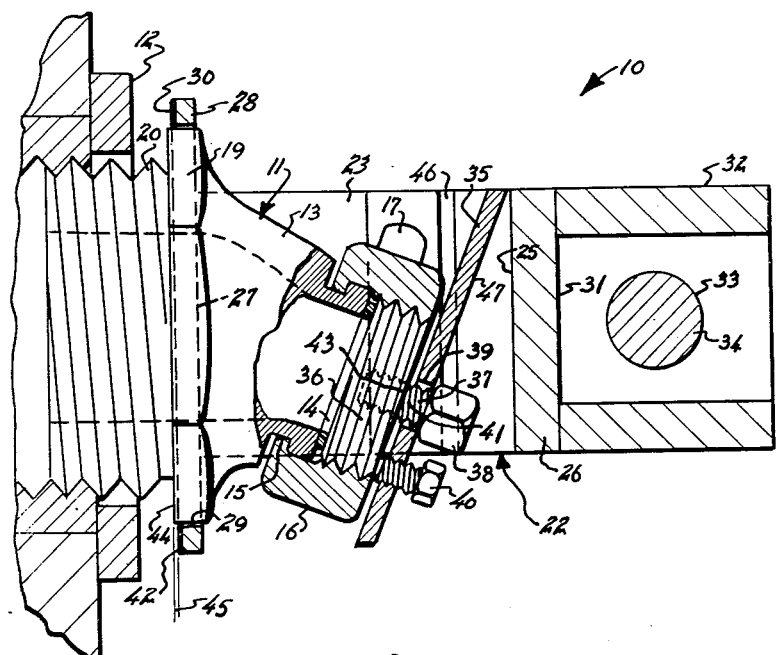
FIG. 3 is a view in elevation and in cross-section taken along the line 3—3 of FIG. 2.

Integrally attached around the curved body section 13 of each fitting 11 as shown in FIG. 3 is a flat-sided flange member 19 having a standard hexagonal shape and a central axis which is horizontally oriented. Fixed to the side of the flange member 19 which is opposite to the side from which extends the curved body section 13 is a straight threaded pipe section 20 whose central axis is coincident with the axis of the hexagonal flange or nut 19. To install the fitting 11, the threaded pipe section 20 must be inserted into a water main conduit 21 and the nut 19 must be turned and tightened until it moves up against the mounting plate 12.

Having described the typical hydrant fitting arrangement, the wrench 10 of the present invention which solves the problem of adequately gripping such a fitting 11 during its installation and removal without damaging the mounting plate 12 and other adjacent fittings 11, will not be described.

Figure 2:
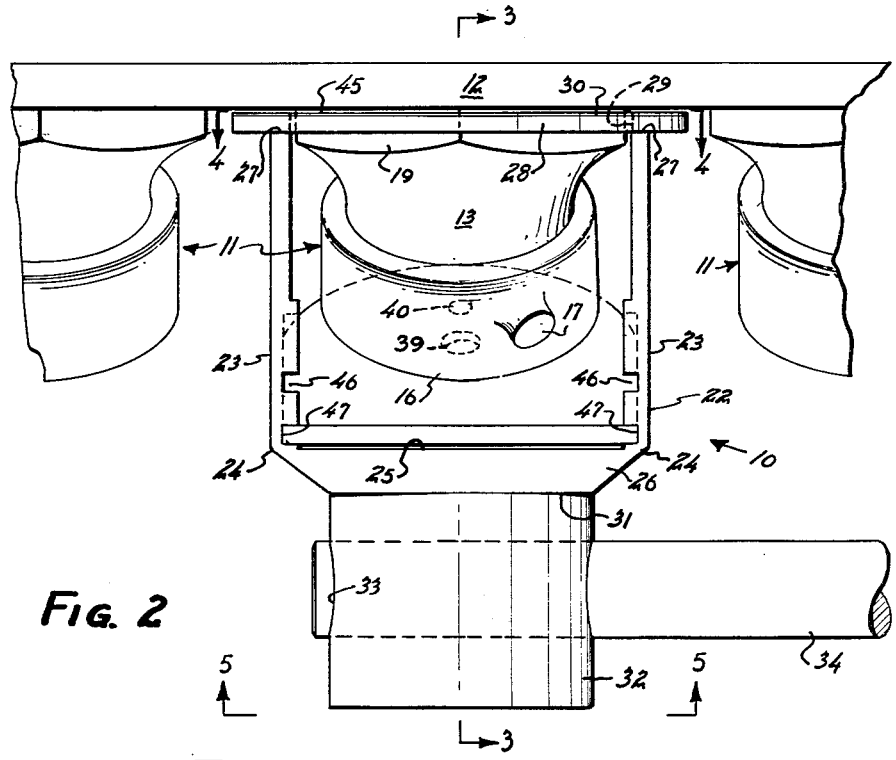
FIG. 2 is an enlarged plan view of a portion of the outlet manifold shown in FIG. 1 showing the attached wrench according to the invention in greater detail.
Figures 4, 5:
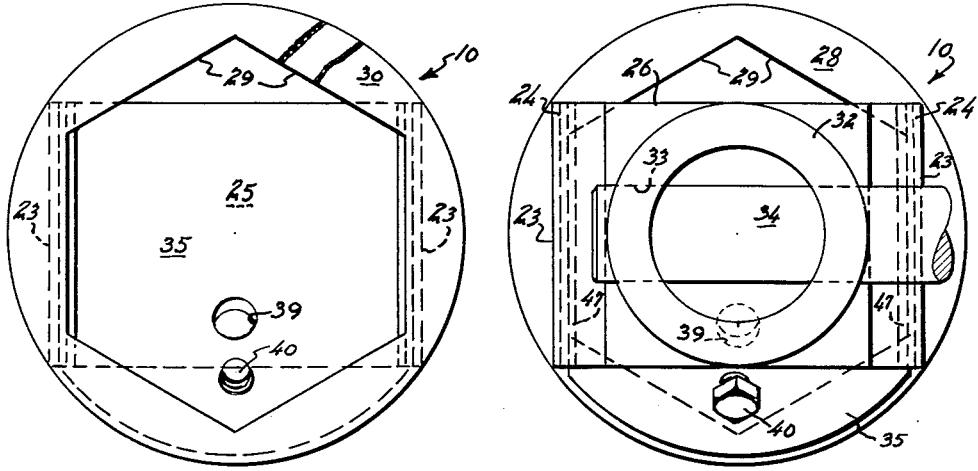
FIG. 4 is a view in elevation and in section taken along the line 4—4 of FIG. 2.
FIG. 5 is an end view in elevation of the "snout wrench" shown in FIG. 2.

As shown in FIGS. 1–3, the wrench 10 comprises a box-like frame 22 having two substantially rectangular side members 23 which are arranged vertically and substantially parallel to each other and which are connected at one of their ends 24 to one side 25 of a cross plate 26. Across the opposite ends 27 of the side members 23 and parallel to the cross plate 26 is fixedly mounted a nut-engaging socket plate 28. As shown in FIGS. 4 and 5, the socket plate 28 preferably has an outer circular shape and a hexagonal cut-out center portion 29 having the same shape but slightly larger than and adapted to engage the hex nut 19 on the fitting 11.

On the face of the socket plate 28 a layer 30 of some non scratching protective material such as rubber or neoprene can be bonded in place to provide some protection for the fitting 11 against inadvertant contact by the socket plate 28. The combined thickness of the plate 28 and the rubber layer 30 is preferably substantially equal to the thickness of the hex nut 19.

Attached to the opposite side 31 of the base plate 26 is a cylindrical neck section 32 preferably formed from a piece of heavy pipe. The neck 32 affords a means to apply a torque force to the wrench 10 and thus to the hex nut 19 of the fitting 11. An ordinary pipe wrench may be used for this purpose or, as shown in FIG. 1, it is convenient to supply a hole 33 through the neck section 32 in which a steel bar 34 can be inserted to afford the turning leverage.

An important feature of the present invention is the novel means whereby the wrench 10 can be positioned on the fitting 11 so that when the socket plate 28 engages the hex nut 19, it will not rub against the mounting plate 12 and nor will it wobble or slip off of the nut 19 when a twisting force is applied to the wrench 19.

The novel structure of the present invention which provides this new and vital clearance-adjusting and stabilizing function on the wrench 10 includes a face plate 35 attached between the parallel side members 23 of the wrench frame 22, as shown in FIG. 3. For wrenches adapted to handle only the drooped or snout-type fittings 11 the face plate 35 is preferably welded in place to the side members 23. As shown in FIG. 3, the face plate 35 is fixed at an angle relative to the base plate 26 substantially equal to the amount of downward curvature from the horizontal of the fitting 11 so that it is located substantially parallel to the plane of the opening 14 of the fitting when the wrench 10 is applied to the fitting 11 and socket plate 28 is placed over the hex nut 19. For fittings on which the outlet body section extends straight out from the mounting plate rather than drooping downward as in the usual case, the face plate 35 would be mounted vertically between the members 23 and parallel to the cross plate 26.

In order to accommodate both the straight and snout-type fittings, we may provide for the face plate 35 to be adjustable to either the vertical or angular position between the parallel side members 23. This is accomplished by the use of retaining grooves 46 and 47 formed on the inside faces of the side members 23 as shown in FIGS. 2 and 3. Thus, the face plate 35 can be removed and inserted in either the vertical slots 46 to accommodate the straight fittings or it can be inserted in the angular slots 47 to accommodate the drooped or snout-type fittings.

Mounted on the face plate 35 as shown in FIG. 3 with the face plate in position for a snout-type fitting 11, is a solid positioning plug member 36 whose axial centerline is coincident with the center of the collar 16 when the hex nut 19 is engaged by the socket plate 28, and which is shown externally threaded to fit the internal threading of the collar 16 on the fitting 11. The positioning plug 36 could, of course, be threaded internally to accommodate an outlet which had external instead of internal threads. The positioning plug 36 is bored and tapped at its center to receive a threaded shaft 37 of a short bolt 38 which serves to retain the plug 36 on the face plate 35. The bolt 38 is attached to the positioning plug 36 through a hole 39 in the face plate 35 which affords ample clearance to the shaft 37 so that the plug member 36 can be moved laterally relative to the face plate 35 to easily align itself with the fitting collar 16.

A second bolt 40 which acts as a set screw is threaded through the face plate 35 and spaced from the short bolt 38 so that it will engage the end of the plug member 36 and when tightened, will prevent any rotation thereof.

Not only should the face plate 35 be located parallel to the opening 14 and thus substantially perpendicular to the central axis of the collar 16 of an attached fitting 11 but the positioning of the face plate 35 relative to socket plate 28 is important so that the wrench 10 can accommodate any variations in sizes of fittings. In accordance with the invention it is preferably that the distance (as seen on FIG. 3) from the center point 41 on the face plate 35 to the outer surface 42 of the socket plate 28 be at least as great as the "length" of the fitting 11, said fitting "length" being measured from the intersections 43 of the axial centerline in the plane of the outer face of the collar 16 to the outer surface 44 of the hex nut 19.

The aforementioned structural members of the wrench 10 including the frame 22 and the face plate 35 may be made from any suitable material of sufficient strength such as mild steel or one of the well-known aluminum alloys. Although we prefer to weld the structural members of the wrench together whenever possible, any suitable fabrication means may be employed within the scope of the invention, and it may even be advantageous to cast certain members as a single integral piece.

In operation, for example, when the wrench 10 is used to remove a fitting 11, installed in a hydrant manifold against a backing plate 12 as shown in FIG. 1, the socket plate 28 is passed easily over the end of the fitting 11 and is drawn up until the collar 16 on the end 14 of the fitting 11 just engages the positioning plug 36 on the face plate 35. With the fitting plug member 18 from the collar 16 having been previously removed, the positioning plug section 36 on the face plate 35 can now be inserted and threaded into the collar 16 by turning the bolt 38. As the positioning plug member 36 is threaded into the collar 16 the wrench 10 is drawn farther onto the fitting 11 and the socket plate 28 is moved easily into engaging position around the hex nut 19 despite the close proximity of similar fittings which heretofore hindered the gripping of the nut. When the socket plate 28 is down almost entirely around the full thickness of the hex nut 19 while a clearance 45 (shown in FIG. 2) still remains between the rubber faced surface 42 of the socket plate 28 and the mounting plate 12, the plug member 36 is no longer turned, and the set screw 40 is tightened by a few quick turns. Now, the wrench 10 is firmly gripping the fitting 11 and yet it is fixed in a position that affords the protective clearance 45.

Thus, no scarfing or scratching of the other fixtures of the polished mounting plate will occur since the present invention can maintain any desired clearance necessary between the wrench and the mounting plant 12. Moreover, since the wrench 10 is gripping the fitting 11 at two points, no wobbling will occur when the twisting force is applied to the wrench and it will remain in its proper present position until the fitting is installed or removed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A wrench for installing and removing a conduit fitting in a hydrant manifold, said fitting having a straight threaded section for connection with a conduit supply main, a flat-sided torque transmitting section axially aligned and integral with said threaded section and an outlet conduit section integrally attached to said torque transmitting section and having an end portion with its central axis located at a fixed predetermined angle with relation to the axis of said threaded section, said wrench comprising: a frame; a socket plate attached to said frame, said socket plate having an inner cutout section with the same shape as and adapted to fit around said integral flat sided torque-transmitting means on said fitting; a face plate mounted within said frame and means on said face plate to attach said end portion of said fitting to said face plate while the wrench is being used to turn said fitting.

2. The device as described in claim 1 including means to adjust said face plate within said frame to a position either parallel with or at an angle relative to said socket plate.

3. The device as described in claim 1 wherein said attaching means on said face plate is freely rotatable on said face plate.

4. The device as described in claim 1 wherein said attaching means comprises a threaded plug section and means fixedly attached to said plug section to rotate said plug section.

5. A wrench for installing and removing a curved-snout conduit fitting of the type having a straight threaded section for connection with a conduit supply main, a flat-sided torque transmitting section axially aligned and integral with said threaded section and a curved outlet conduit section integrally attached to said torque transmitting section and having an end portion with its central axis located at a fixed predetermined angle with relation to the axis of said threaded section, said wrench comprising: a frame; a socket plate attached to said frame, said socket plate having an inner cutout section with the same shape as and adapted to fit around said integral flat sided torque-transmitting means on said fitting and to move axially relative to said torque transmitting means; a face plate mounted within said frame and means on said face plate for attaching said outlet end portion of said fitting to said face plate while the wrench is being used to turn said fitting, said attaching means providing means for adjusting the position of the said fitting on the wrench so as to fix the amount of axial penetration of said torque-transmitting means within said socket plate to a desired amount.

6. The device as described in claim 5 wherein said positioning means comprises: a face plate mounted in said frame end; a rotatable positioning plug attached to said plate, and substantially axially aligned with said threaded exit end.

7. The device as described in claim 1 wherein said positioning plug has external threads and a bolt fixed therein in substantial alignment with the central axis of said plug; a hole through said fixed plate, said hole being larger than said bolt and located on said fixed plate so that said positioning plug is easily rotatable thereon in substantial alignment with the said end opening of said fitting when said socket plate is in position around said fitting nut portion, said positioning plug being thus rotatable to be threaded into said end opening to thereby adjust the position of said fitting relative to said wrench.

References Cited in the file of this patent

UNITED STATES PATENTS

| | | |
|---|---|---|
| 1,335,386 | Nicholas | Mar. 30, 1920 |
| 2,589,935 | Guisti | Mar. 18, 1952 |